Jan. 7, 1936.    G. W. McKEE    2,026,793
PRESSURE REGULATOR
Filed Oct. 12, 1934    2 Sheets-Sheet 1
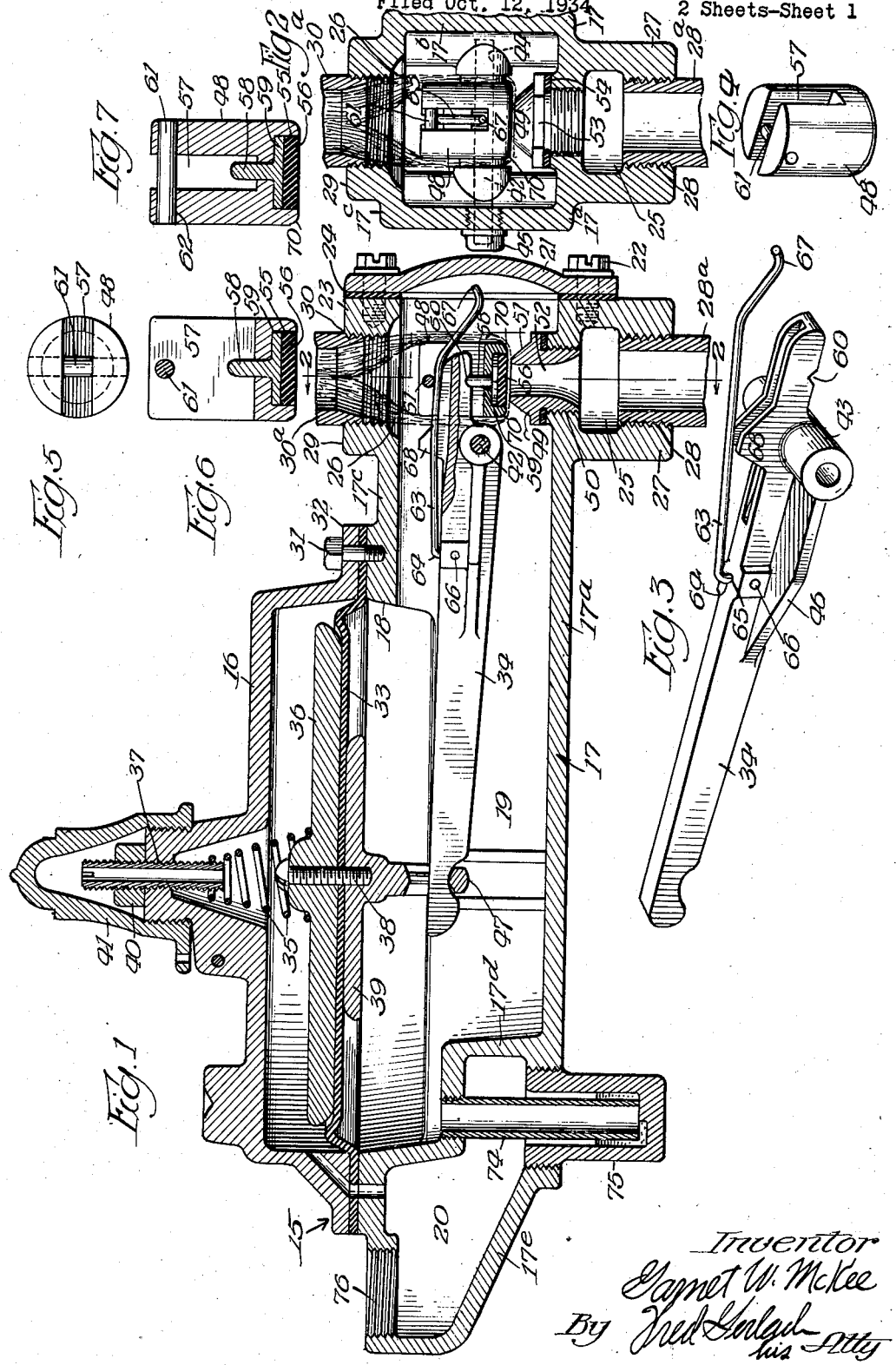
Inventor
Garnet W. McKee
By Fred Gerlach
his Atty Jan. 7, 1936.  G. W. McKEE  2,026,793
PRESSURE REGULATOR
Filed Oct. 12, 1934   2 Sheets-Sheet 2
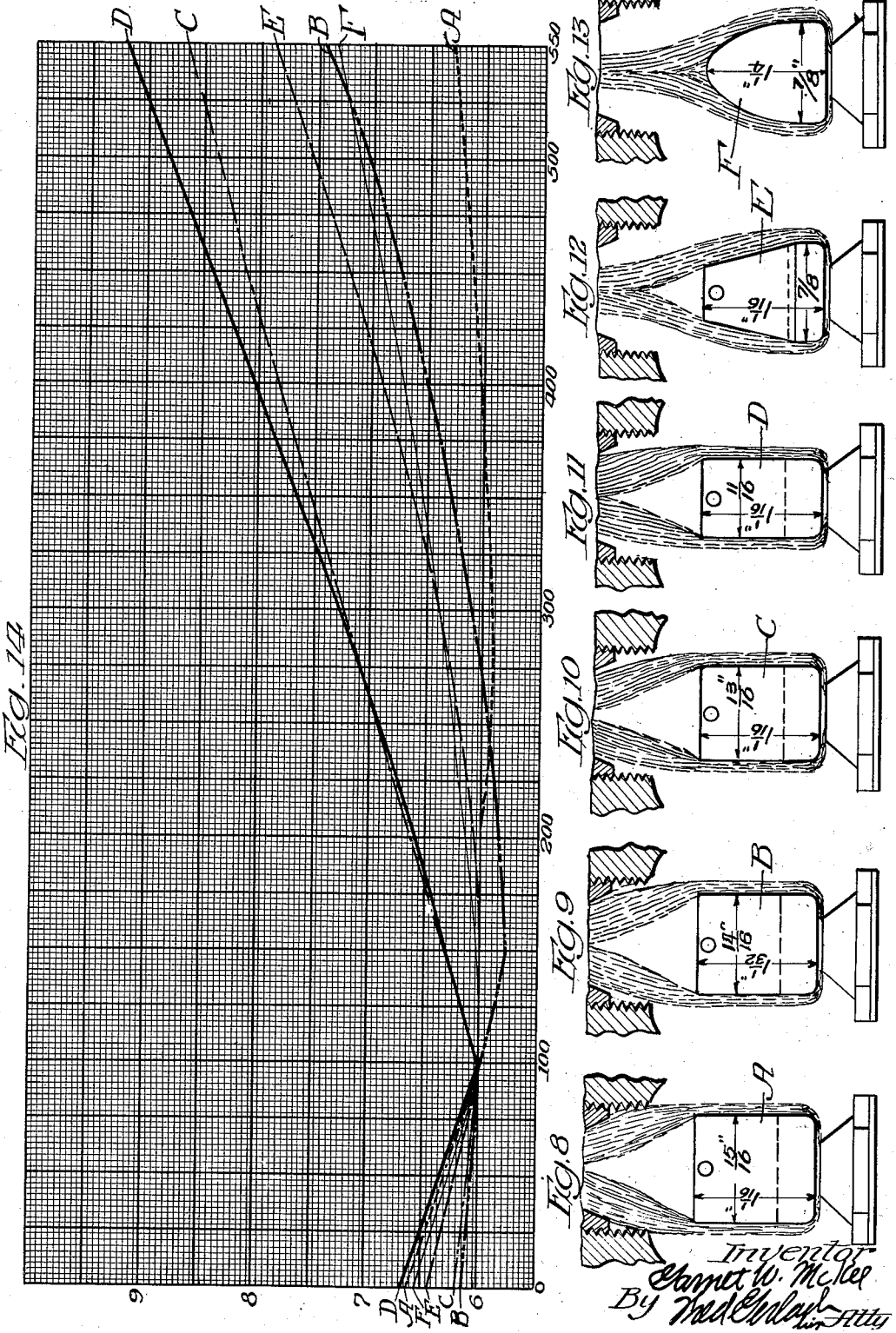

Patented Jan. 7, 1936

2,026,793

UNITED STATES PATENT OFFICE 2,026,793

PRESSURE REGULATOR

Garnet W. McKee, Rockford, Ill.

Application October 12, 1934, Serial No. 748,066

7 Claims. (Cl. 50—26)

The present invention relates generally to pressure regulators. More particularly the invention relates to that type of regulator which is designed primarily for use in a system for supplying gas to different household or industrial gas-burning appliances, serves to maintain substantial uniformity of pressure of the gas in the usual piping between it and the appliances regardless of the rate of flow of the gas and includes as the essential or main parts thereof: (1) an elongated, horizontally extending, casing which comprises a lower part having a gas chamber therein and embodying at one of its ends an inlet for the gas and a gas outlet above and in registry with the inlet, and also comprises an upper part over the other end of the lower part; (2) a diaphragm which is clamped between the upper and lower parts of the casing and is responsive to fluctuations in the pressure of the gas in the chamber; (3) a horizontal lever which extends lengthwise of and is centrally fulcrumed in the gas chamber and is operatively connected at one end thereof to the diaphragm; and (4) a valve which is mounted on the other end of the lever for limited universal movement and operates in response to fluctuation or action of the diaphragm to control the flow of gas through the inlet into the casing so as to maintain the gas as it passes through the outlet at the pressure for which the regulator is set.

One object of the invention is to provide a pressure regulator of this type which is an improvement upon previously designed regulators of the same general type and for the same purpose by reason of the fact that the valve thereof is so shaped and constructed that the gas entering the casing from the inlet is caused to flow upwardly in close proximity to the side wall of the valve and to enter the gas outlet without resistance which would tend to cause a decrease in outlet pressure of the gas during an increase in the rate of flow of the gas.

Another object of the invention is to provide a pressure regulator which is generally of new and improved construction and in which the valve and lever are so constructed and arranged that the regulator may if desired and by the substitution of one valve for another be made to cause an increase in the outlet pressure of the gas as the volume or rate of flow increases through the system with which the regulator is associated.

A further object of the invention is to provide a pressure regulator of the type and character under consideration in which the valve has the advantage of greater simplicity, greater effectiveness and lower cost of manufacture as compared with valves of previously designed regulators and is hung in a novel manner from the lever.

A still further object of the invention is to provide a pressure regulator in which the lever extends through a slot in the top portion of the valve and is of such thinness that it exposes but a small surface to the upflow of gas in the casing and thus causes a minimum amount of resistance to the gas as the latter flows to the outlet in the casing.

Other objects of the invention and the various advantages and characteristics of the present pressure regulator will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a vertical longitudinal section of a pressure regulator embodying the invention;

Figure 2 is a vertical transverse section on the line 2—2 of Figure 1;

Figure 3 is a perspective of the lever of the regulator;

Figure 4 is a perspective of the valve;

Figure 5 is a top view of the valve;

Figures 6 and 7 are vertical transverse sectional views of the valve taken at right angles to one another;

Figures 8, 9, 10, 11, 12 and 13 are side views of different forms of valves which may be used in the regulator; and Figure 14 is a graph showing the performance curves of the regulator when the latter is used with the valves of Figures 8, 9, 10, 11, 12 and 13.

The regulator which forms the subject matter of the invention is adapted for use in a system for supplying gas from a gas main to different household or industrial gas burning appliances. It comprises an elongated, horizontally extending casing 15 and operates to reduce or cut down the pressure of the gas as it flows from the gas main and to maintain substantial uniformity of pressure of the gas flowing to the different appliances regardless of the rate of flow of the gas. The casing 15 is preferably formed of cast metal and embodies an upper part 16 and a lower part 17. The lower part of the casing comprises a bottom wall 17a, a pair of side walls 17b, a top wall 17c, a cross wall 17d and an end wall 17e. The top wall 17c is provided in the central portion thereof with a circular opening 18. The cross wall is located adjacent to the end wall 17e and with the other walls of the lower part of the casing defines a gas chamber 19 at one side thereof and a relief chamber 20 at its other side. The end of the lower part 17 of the casing that is opposite to the end wall 17b is closed by means of a plate 21. The latter is removably secured in place by means of bolts 22 which extend through the margin thereof and fit within internally threaded holes in a flange 23. The latter projects outwardly from and is formed integrally with the bottom, side and top walls of the lower part of the casing. A gasket 24 is interposed between the flange and the margin of the plate for sealing purposes. When the plate 21 is removed access may be had to the gas chamber 19. The end of the lower part of the casing which has the plate 21 embodies an inlet 25 for gas and a gas outlet 26. The inlet 25 is in the form of a tubular part 27 which is formed integrally with and depends from the bottom wall 17a and embodies an internal screw thread 28 for connection to a gas delivery pipe 28a. The latter is in the nature of a branch from the gas main and serves to supply gas via the inlet 25 to the gas chamber 19. The outlet 26 is in the form of a tubular part 29 which is formed integrally with and projects upwardly from the top wall 17c of the lower part of the casing. The part 29 is located directly above the inlet forming part 27 and embodies an internal screw thread 30 for connection to a service pipe 30a. The latter includes the usual meter (not shown) and serves to conduct gas from the casing of the regulator to the different gas burning appliances which are supplied with gas by the system in which the regulator is employed. The upper part 16 of the casing is located above the opening 18 in the top wall 17c and is connected removably to the lower part of the casing by means of bolts 31. The latter extend through an outwardly extending flange 32 on the upper part of the casing and fit within integrally threaded holes or sockets in the portion of the top wall 17c of the lower part of the casing that defines the circular opening 18.

In addition to the casing 15, the regulator comprises a circular diaphragm 33 and a substantially horizontal lever 34. The diaphragm extends across the circular opening 18 and has the marginal part thereof clamped between the flange 32 and the subjacent portion of the top wall 17c of the lower part of the casing. The lower face of the diaphragm is exposed to the gas that passes into the chamber 19 through the inlet 25 and hence the diaphragm responds to variations in pressure of the gas in the chamber. The upper face of the diaphragm is subjected to the action of a spring 35 which extends between a cast metal plate 36 and a hollow adjusting screw 37. The plate 36 fits against the upper face of the diaphragm and is held in place by a screw 38. This screw extends through the center of the diaphragm and is anchored to a plate 39 which fits against the lower face of the diaphragm. The adjusting screw 37 extends through the central portion of the upper part 16 of the casing and is held in place by a lock nut 40. By adjusting the position of the screw 37 the tension of the spring 35 may be varied for regulator setting purposes. A cap 41 is removably secured by a screw thread to the central portion of the upper part 16 of the casing and serves as a closure for and to protect the lock nut 40 and the upper end of the adjusting screw. The lever 34 is disposed in the gas chamber 19 of the lower part of the casing 15 and extends between the gas inlet 25 and the central portion of the plate 39 on the under or bottom side of the diaphragm 33. It is preferably in the form of a die casting of metal having high tensile strength and is of materially less thickness than height as shown in Figure 3 of the drawings. A pin 42 serves as a fulcrum for the lever. This pin extends through a horizontally extending cylindrical bearing member 43 on the central portion of the lever and the ends thereof fit within oppositely facing sockets 44 in the side walls 17b of the lower part of the casing. One of the sockets 44 is open at its outer end so that the pin may be removed from the casing during installation or removal of the lever with respect to the casing. An externally threaded plug 45 fits in the socket with the open outer end and serves when screwed into place to hold the pin against axial displacement. The cylindrical bearing member 43 is formed as an integral part of the lever 34. It projects outwardly from the sides of the lever and is located a small distance inwardly from the end of the lever nearer the gas inlet 25. A pair of horizontally extending ribs 46 project outwardly from the sides of the lever. These ribs extend between the central portion of the lever and the ends of the cylindrical bearing member 43 and serve to strengthen or reinforce the lever. The end of the lever that is disposed adjacent to the plate 39 is operatively connected to the diaphragm 33 by means of a stirrup 47. The latter is connected to, and extends downwardly from, the central part of the plate 39 and operates to swing the lever vertically in response to movement of the diaphragm. The end of the lever that is remotely positioned with respect to the plate 39 and carries the cylindrical bearing member 43, supports a valve 48. This valve coacts with a valve seat 49 and is adapted in response to swinging of the lever 34 by the diaphragm to control the flow of gas into the gas chamber 19. When the pressure of the gas in the chamber 19 increases beyond a certain point the diaphragm 33 is forced upwardly. This upward movement of the diaphragm is in turn imparted to the lever 34 and serves to shift the valve into its closed position in order to cut off or reduce the inflow of gas into the chamber 19 and thus maintain uniformity of pressure as far as the gas passing through the outlet 26 is concerned. When the pressure in the gas chamber 19 decreases, the diaphragm 33 moves downwardly and causes the lever 34 to swing so as to shift the valve 48 into its open position. Opening of the valve results in a greater flow of gas into the chamber 19 and stabilization or uniformity of pressure. The valve seat 49 is located directly above the gas inlet 25 and is secured to the bottom wall 17a of the lower part of the casing by a screw thread connection 50. It is provided with a tapered upper part 51 and embodies a central passage 52 through which the gas passes from the inlet 25 to the gas chamber 19. A polygonal flange 53 is formed on the central portion of the valve seat so that the seat may be turned by wrench or similar turning tool in connected relation with the bottom wall of the casing part 17. A gasket 54 serves to prevent leakage of gas around the valve seat. This gasket is mounted on the central portion of the valve seat and is clamped between the polygonal flange 53 and the subjacent portion of the bottom wall of the lower part 17a of the casing. When it is desired to obtain access to the valve seat the plate 21 is removed by withdrawing the bolts 22 from the flange 23.

The valve 48 is in the form of a vertically extending cylinder. It extends between the gas inlet 25 and the outlet 26 and is formed of brass or any other suitable metal. A circular pocket 55 is formed in the bottom face of the valve and a disk 56 of hard leather or any other suitable composition sealing material is disposed in this pocket as shown in Figures 6 and 7 of the drawings. The disk 56 is held in place in the pocket in any suitable manner and is adapted to fit against the tapered part 51 of the valve seat 49 in order to close the central passage 52 and cut off the flow of gas from the inlet 25 to the gas chamber 19. The end of the lever 34 that supports the valve 48 extends into a diametric slot 57 in the valve. This slot, as shown in the drawings, extends through the top and central portions of the valve and is slightly thicker than the lever so as to permit the valve to move or tilt sidewise to a limited extent for valve seating purposes. A vertically extending stud 58 is disposed in the bottom portion of the slot 57. The lower end of this stud projects into the circular pocket 54 and embodies a circular head 59. The latter serves as an anchor for the stud and is held in the upper portion of the pocket by means of the disk 55 of sealing material. The upper end of the stud is hemispherical and fits in a notch 60 in the bottom face of the portion of the lever 34 which is disposed in the slot 57. This notch together with the stud forms a joint or a connection between the valve and the lever whereby the valve is permitted to move universally to a limited extent relatively to the lever. The stud 58 is preferably of such length that the contiguous portion of the lever is positioned sufficiently far from the bottom of the slot 57 so that the valve may tilt lengthwise of the lever to the proper extent to seat the disk 55 against the tapered part 52 of the valve seat when the lever is swung by the diaphragm into a valve closing position. The valve 48 is supported from the lever by means of a pin 61. The latter extends across the top portion of the slot 57 and is mounted in oppositely facing holes 62 in the upper portion of the valve. The central portion of the pin, that is, the portion in the slot 57 overlies the portion of the lever above the stud 58 and rests on the central portion of a strip 63 of spring wire. The spring wire strip extends longitudinally of the lever and is bent downwardly at one end so as to form an anchor piece 64. The latter extends downwardly into a hole 65 in the central portion of the lever 34. A hole 66 is formed in the lever so that it intersects the hole 65 and permits the central portion of the anchor piece 64 to be deflected by way of a punching tool or similar device (not shown). The central portion of the spring wire strip 63 bears against the pin 61 and is under such spring tension as the result of the bend which forms the anchor piece 64 that it urges the valve 48 upwardly and holds the stud 58 in the notch 60. As shown in Figure 1 of the drawings there is sufficient clearance between the pin 61 and the top face of the subjacent portion of the lever to permit the valve to be forced downwardly against the force of the spring in order to permit of assembly and removal of the valve with respect to the lever. The free end of the spring wire strip 63 extends downwardly and is provided with an upturned hook part 67. This hook part is adapted to facilitate mounting of the valve on the lever when the lever is in the gas chamber 19. In assembling or mounting the valve on the lever the spring wire strip 63 is pressed downwardly either by placing the finger against the hook part 67 or by first moving the hook part downwardly with the pin 61 of the valve. Thereafter the valve is shifted inwardly and downwardly toward the lever until the stud 58 is brought into registry with the notch 60. When the valve is released the spring wire strip 63 springs or forces it upwardly and snaps the stud into place in the notch 60. When it is desired to remove the valve from the lever the plate 21 is first removed and then the valve is moved downwardly against the force of the spring wire strip and pulled away from the lever. The spring wire strip 63 is held against transverse displacement with respect to the lever by means of a pair of laterally spaced webs 68. These webs extend upwardly from and are formed as an integral part of the top face of the lever. They lap the sides of the spring wire strip and are positioned directly above the cylindrical bearing member 43 for the pin 42. During tilting of the valve 48 with respect to the lever in connection with closing of the disk 55 against the tapered part of the valve seat 49 the pin 61 rides on top of the central portion of the spring wire strip 63. The outer or free end of the spring wire strip 63 is preferably of such length that the hook part 67 is readily accessible when the plate 21 is removed from the casing. As shown in the drawings the central portion of the plate 21 is bulged slightly outwardly and the hook part is located in the concavity on the inner face of the plate. By arranging the hook part in this manner it may be readily manipulated during mounting or removal of the valve with respect to the lever. As shown in the drawings the valve 48 is coaxially disposed with respect to the gas outlet 26. By reason of the fact that the valve supporting end of the lever is extremely thin and fits in a diametric slot in the valve there is but a minimum lever surface exposed to the flow of gas passing from the inlet 25 to the gas outlet 26 and consequently resistance to flow of the gas is reduced to a minimum. This feature is of extreme importance in connection with a regulator of this character wherein efficiency in operation and uniformity over wide ranges of capacity are essential factors. A feature of arranging the valve supporting spring wire strip 63 as shown and described is that the valve may be removed with extreme ease for replacement, inspecton, or cleaning. Another feature of the specific spring arrangement shown is that the cost of manufacture is reduced to a minimum.

In order to control the flow of gas from the inlet 25 to the gas outlet 26 so as to obtain maximum efficiency and substantially perfect performance of the regulator, the lower end of the valve 48 is shaped so that it embodies a rounded or smoothly curved surface 70 between its bottom and side faces, and the disk 56 is set into the pocket 55 so that the bottom face thereof is flush with the bottom face of the valve. The curve of this surface is a quadrantal one and as a result the gas flowing into the chamber against the disk 56 instead of striking against a sharp edge which would tend to direct it outwardly from the valve flows around the surface and flows upwardly along the side surface of the valve as shown in Figure 1 of the drawings. The curved surface 70 serves to draw the gas upwardly after it passes horizontally across the bottom face of the valve and directs the gas so that it flows in a fine annular stream around the valve 48. The diameter of the valve is slightly less than the diameter of the gas outlet 26 and consequently the gas flowing upwards around the side face of the valve passes directly into the service pipe 30a. This is an important feature as far as the performance and efficiency of the regulator is concerned for two reasons. The first reason is that the gas passes through the regulator casing with a minimum amount of pressure loss due to friction and as a result there is no diminution in the outlet pressure of the gas as the rate of flow increases. If the gas instead of flowing upwardly directly into the gas outlet 26 were caused to flow laterally or horizontally into the casing prior to outflow through the outlet it would encounter such resistance that the pressure within the casing would tend to increase during an increase in flow of the gas through the regulator casing. As a result of such increase in pressure of the gas in the casing the diaphragm would operate the lever so as to reduce the size of the orifice between the valve and the valve seat and hence there would be a tendency for the outlet pressure of the gas to decrease during an increase in the rate of flow of the gas through the system with which the regulator is associated. By directing the gas in an annular stream around the side wall of the valve and so that it passes directly into the pipe with a minimum amount of pressure loss, there is no tendency for the outlet pressure of the gas to decrease as the rate of flow of gas increases. The second reason why it is of prime importance in connection with the efficiency and performance of the regulator to direct the gas in an annular stream so that it flows and passes directly into the outlet opening of the casing as shown in Figure 1 of the drawings, is that the gas in flowing through the casing produces a jet action in the casing. This jet action increases in magnitude as the velocity or rate of flow through the casing increases and results in a diminution of the pressure in the casing. As the result of this diminution in the pressure of the gas in the casing as the velocity or rate of flow of gas through the system increases the action of the diaphragm is such that the valve is operated to provide an increase in flow of gas from the gas inlet and consequently there is an increase in the outlet pressure of the gas as the velocity or rate of flow of the gas increases.

This is of importance as far as the performance of the regulator is concerned because in some instances it is essential for proper operation to increase the outlet pressure of the gas at the outlet opening as the velocity of the gas increases in order to compensate for the increased pipe line and meter pressure loss during an increase in velocity or rate of flow of the gas through the system in which the regulator is used or associated. The amount of jet action of the annular stream of gas flowing upwards along the side face of the valve and directly into the gas outlet 26 is determined by the diameter of the valve or the shape of the side wall of the valve. This is manifest from the graph which constitutes Figure 14 of the drawing and shows the performance curves of a regulator with a one inch outlet opening for the gas, when tested with the different valves shown in Figures 8, 9, 10, 11, 12 and 13. In this graph the horizontal units represent cubic feet of gas per hour and the vertical units represent outlet pressure as expressed in inches of water head. The valve shown in Figure 8 is shown as having a diameter of $\frac{13}{16}$ of an inch and a height of $1\frac{1}{16}$ inches. The curve designated A on the graph is the performance curve of the regulator when used with this valve. It is to be noted that this curve is substantially straight and indicates that the outlet pressure of the gas is substantially uniform throughout a wide range of capacity. The reason why the outlet pressure of the gas is substantially uniform throughout a wide range of capacity when the regulator is used with the valve shown in Figure 8 is that the valve is but slightly smaller in diameter than the gas outlet opening and hence the gas flows directly into the outlet opening with but little if any jet action. With no jet action in the casing and no restriction to the flow of gas into the outlet opening the outlet pressure of the gas is substantially the same throughout the entire range and capacity of the regulator. The valve of Figure 9 is shown as but 14/16 of an inch in diameter and $1\frac{1}{16}$ inches in height. When this valve is used in the regulator, the regulator has the performance curve B. It is to be noted from this curve that when the regulator is equipped with the valve of Figure 9 the outlet pressure of the gas increases gradually as the volume or rate of flow of the gas increases. The gradual increase in outlet pressure of the gas as the flow of gas increases is attributable to the fact that the annular stream of gas passing upwardly around the side face of the valve into the gas outlet opening is smaller in diameter than the outlet opening and produces within the casing a jet or jet action within the casing. This action, as previously pointed out, results in a decrease in the pressure of the gas in the regulator casing as flow of gas through the casing increases and causes by the action of the diaphragm such a flow of the gas as to increase the outlet pressure. The valve of Figure 10 is shown as having a diameter $\frac{13}{16}$ of an inch and a height of $1\frac{1}{16}$ inches. When this valve is used in the regulator the regulator has the performance curve C. This curve shows that there is a material increase in outlet pressure of the gas as the volume of gas passing through the system increases. It is to be noted by comparing the performance curve C with the performance curve B that the increase in outlet pressure as the rate of flow increases is greater when the regulator is equipped with the valve of Figure 10 than when it is equipped with the valve of Figure 9. This is attributable to the fact that the valve of Figure 10 is of slightly smaller diameter than the valve of Figure 9 and as a result the jet action of the gas flowing into the outlet opening is correspondingly greater. The valve of Figure 11 is shown as having a diameter of $\frac{13}{16}$ of an inch and a height of $1\frac{1}{16}$ inches. The curve D of the graph is the performance curve of the regulator when used with this valve. It is to be noted from the curve D that the regulator when equipped with the valve of Figure 11 operates materially to increase the outlet pressure of the gas as the volume of the gas increases. The valve of Figure 11 because of its pronounced jet action in the regulator casing is of special utility when the regulator is used in a system wherein there is great line and meter loss of the gas during an increase in the rate of flow of the gas through the system. The Figure 12 valve differs from the valves shown in Figures 3, 8, 9, 10 and 11 in that it is frusto-conical. It is flat on the bottom and has a smoothly rounded or curved surface 71. The curve of the latter is a quadrantal one like the curves of the smoothly rounded surfaces of the cylindrical valves shown in the drawings and operates to cause the gas to flow upwardly around the side wall of the valve. By reason of the fact that the side wall of the valve is frusto-conical the gas flows upwardly and inwardly over the side wall of the valve and enters the outlet opening of the casing of the regulator in the form of a jet. The curve E of the graph is the performance curve of the regulator when the latter is used with the Figure 12 valve.

The Figure 13 valve is in the form of a conoid the base of which is flat and has a smoothly curved peripheral surface 72 whereby the gas which strikes against the bottom face is caused to flow upwardly along the side wall of the valve. By reason of the fact that the valve is in the form of a conoid the gas is jetted into the central part of the outlet opening and the valve in this respect operates similarly to the Figure 12 valve. The curve F of the graph is the performance curve of the regulator when the latter is equipped with the Figure 13 valve.

Assuming that the valve 48 is open, the operation of the regulator is as follows: Gas enters the casing 17 via the central passage 52 in the valve seat 49 and strikes against the bottom face of the disk 56. From this disk the gas flows outwardly until it encounters the smoothly curved surface 70 which operates to cause the gas to flow upwardly around it and to travel upwards along the side face of the valve to the gas outlet 26. When the appliances which are supplied with gas by the service pipe 30a are operated at greater capacity and as a result the flow of gas through the service pipe 30a increases the diaphragm 33 in the regulator casing operates because of the resultant decrease in pressure of the gas in the chamber 19 to open the valve 48 so as to permit of an increase in flow of the gas from the branch pipe 28a to the service pipe. This increase in flow or volume of the gas increases the pressure in the service pipe 30a. When the appliances receiving gas from the service pipe 30a are cut down so as to decrease the consumption of gas pressure builds up in the chamber 19 and causes the diaphragm 33 through the medium of the lever 34 to shift the valve so as to decrease the orifice between the valve and the valve seat and thus reduce the inflow of gas through the casing and stabilize the outlet pressure. Because of the specific shape and construction of the valve 48 and the fact that the gas flows into the gas outlet directly and with a minimum amount of pressure loss there is no diminution in the outlet pressure of the gas as the rate of flow of gas through the system increases. Because of the manner in which the gas flows into the outlet opening 26 and the resultant jet action in the regulator casing the regulator has a tendency to cause an increase in outlet pressure of the gas as the rate of flow of gas increases through the service pipe 30a. When it is desired to increase the outlet pressure of the gas as the volume or rate of flow of the gas increases it is only necessary to remove the valve 48 and substitute for it a valve of smaller diameter or one having a side surface such as the valve of Figure 12. To remove the valve 48 for replacement or repair purposes it is only necessary as previously pointed out to disconnect the plate 21 from the casing and then depress the valve against the action or force of the spring wire strip 63 and pull it from the outer end of the lever 34. When it is desired to have the regulator control the gas so that the pressure thereof is substantially uniform regardless of the volume or rate of flow of the gas through the regulator, a valve such as that shown in Figure 8 is employed. If it is desired to have the regulator control the gas so that the outlet pressure tends to increase as the volume or rate of flow increases a valve like any one of those shown in Figures 9, 10, 11, 12 and 13 may be employed.

In order to prevent the escape of gas in the event that excessive pressure is developed in the gas chamber 19 as the result of foreign particles preventing closing of the valve 48, a relief tube 74 is provided. This tube extends through the cross wall 17d of the lower casing part 17 and is arranged so that one end thereof projects downwardly in a cup 75 which is partially filled with mercury and communicates with the relief chamber 20. When excessive pressure develops in the gas chamber 17 the gas displaces the mercury in the cup and escapes via the relief chamber 20 to a vent opening 76.

The service regulator herein described and shown is not only extremely efficient in operation but may be manufactured at a low and reasonable cost due to the simplicity of the valve assembly. The valve is characterized by the fact that it causes the gas as it issues or flows from the orifice between it and the valve seat to flow upwardly along the side wall and to pass directly into the gas outlet opening of the regulator casing without the formation of eddy currents and without any of the gas being directed into the chamber 19 between the diaphragm 33. The valve is further characterized by the fact that it lends itself to ready replacement and by the shaping thereof the regulator may be controlled or set so as to cause the outlet pressure of the gas to increase as the volume or rate of flow of the gas increases through the system with which the regulator is used. The lever 34 is characterized by the fact that because of its thinness in construction at the point where it supports the valve there is but a minimum of surface exposed to retard or resist flow of the gas around the side wall of the valve. Another feature of the valve assembly resides in the fact that the valve is supported for free, limited universal movement and the lever bears on the stud 58 at a point near the bottom face of the valve with the result that the regulator has an extremely efficient "lock-up" performance, that is, the valve thereof completely closes when there is no flow of gas through the system without an undue increase in pressure in the regulator casing. As shown in the graph which constitutes Figure 14 of the drawings there is but a very small increase in pressure when the volume of gas through the system or regulator drops to zero.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a pressure regulator of the character described, the combination with a casing having in one portion thereof a diaphragm adapted to fluctuate in response to changes in pressure within the casing, and having in another portion thereof an inlet for gas under pressure and a gas outlet directly opposite to the inlet, of means forming a valve seat around the inner end of the inlet, a valve for controlling the flow of gas into the casing disposed between the inlet and outlet and in spaced relation with respect to the interior surfaces of the casing and having a seat engaging face disposed directly opposite to the valve seat and adapted to have the gas strike thereagainst and also having a substantially continuous side face centrally positioned with respect to the gas outlet and of less width than the latter and a smoothly curved or rounded surface between the two faces whereby when the valve is open the gas after striking against the first mentioned face is caused to flow in a thin tubular stream around the side face of the valve and then to pass directly into the outlet with substantially no pressure loss and in such manner as to create adjacent to the inner end of the outlet a jet action which increases in magnitude as the rate of flow of gas into the outlet increases and effects a corresponding diminution or decrease of pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having the valve connected to one end thereof and its other end connected to the diaphragm so that it operates to open the valve when the diaphragm fluctuates in one direction as the result of a decrease in pressure within the casing.

2. In a pressure regulator of the character described, the combination with a casing having in one portion thereof a diaphragm adapted to fluctuate in response to changes in pressure within the casing, and having in another portion thereof an inlet for gas under pressure and a circular gas outlet directly opposite to the inlet, of means forming an annular valve seat around the inner end of the inlet, a valve for controlling the flow of gas into the casing disposed between the inlet and outlet and in spaced relation with respect to the interior faces of the casing and having a substantially flat, circular face disposed directly opposite to the valve seat and adapted to have the gas strike thereagainst, and also having an annular side face coaxially positioned with respect to the gas outlet and of smaller diameter than the latter and a smoothly curved or rounded surface between the two faces whereby when the valve is open the gas after striking against the flat face is caused to flow in a thin tubular stream around the side face of the valve and then to pass directly into the outlet with substantially no pressure loss and in such manner as to create adjacent to the inner end of the casing outlet a venturi or jet action which increases in magnitude as the rate of flow of the gas into the outlet increases and effects a corresponding diminution or decrease in the pressure of the gas in the casing, and a lever for moving the valve in response to fluctuation of the diaphragm to and from the valve seat in order to regulate the pressure of the gas flowing out of the casing via the outlet, fulcrumed centrally in the casing and having the valve connected to one end thereof and its other end connected to the diaphragm so that it operates to open the valve when the diaphragm fluctuates in one direction as the result of a decrease in pressure within the casing.

3. In a pressure regulator of the character described, the combination with a casing having in one portion thereof a diaphragm adapted to fluctuate in response to changes in pressure within the casing and having in another portion thereof an inlet for gas under pressure and a circular gas outlet directly opposite to the inlet, of means forming a valve seat around the inner end of the inlet, a valve for controlling the flow of gas into the casing disposed between the inlet and outlet and in spaced relation with respect to the interior faces of the casing and having a substantially flat, circular face disposed directly opposite to the valve seat and adapted to have the gas strike thereagainst, and also having a cylindrical side face coaxially arranged with respect to the gas outlet and a quadrantally curved surface between the two faces whereby when the valve is open the gas after striking against the flat face is caused to flow in a thin tubular stream around the side face of the valve and then to pass directly into the outlet with substantially no pressure loss and in such manner as to create adjacent to the inner end of the casing outlet a venturi or jet action which increases in magnitude as the rate of flow of the gas into the outlet increases and effects a corresponding diminution or decrease in the pressure of the gas in the casing, and a lever for moving the valve in response to fluctuation of the diaphragm to and from the valve seat in order to regulate the pressure of the gas flowing out of the casing via the outlet, fulcrumed centrally in the casing and having the valve connected to one end thereof and its other end connected to the diaphragm so that it operates to open the valve when the diaphragm fluctuates in one direction as the result of a decrease in pressure within the casing.

4. In a pressure regulator of the character described, the combination with a casing having in one portion thereof a diaphragm adapted to fluctuate in response to changes in pressure within the casing and having in another portion thereof an inlet for gas under pressure and a circular gas outlet directly opposite to the inlet, of means forming a valve seat around the inner end of the inlet, a frusto-conical valve for controlling the flow of gas into the casing disposed between, and centrally positioned with respect to, the inlet and outlet and having the base thereof substantially flat and positioned directly opposite to the valve seat and adapted to have the gas strike thereagainst, said valve being of smaller diameter at the small end thereof than the outlet and having a smoothly curved or rounded surface between its base and side face whereby the gas after entering the casing via the inlet and striking against the base is caused to flow in a thin stream around the side face of the valve and then to pass directly into the outlet with substantially no pressure loss and in such a manner as to create adjacent to the inner end of the casing outlet a jet action which increases in magnitude as the rate of flow into the outlet increases and effects a corresponding diminution or decrease in the pressure of the gas in the casing, and a lever for moving the valve in response to fluctuation of the diaphragm to and from the valve seat in order to regulate or control the pressure of the gas flowing out of the casing via the outlet, fulcrumed centrally in the casing and having the valve connected to one end thereof and its other end connected to the diaphragm so that it operates to open the valve when the diaphragm fluctuates in one direction as the result of a decrease in pressure within the casing.

5. In a pressure regulator of the character described, the combination with a casing having in one portion thereof a diaphragm adapted to fluctuate in response to changes in pressure within the casing and having in another portion thereof an inlet for gas under pressure and a gas outlet directly opposite to the inlet, of means forming a valve seat around the inner end of the inlet, a valve for controlling the flow of gas into the casing disposed between and positioned centrally with respect to the inlet and the outlet and in the form of a conoid, said valve having the base thereof substantially flat and positioned opposite to the valve seat so that the gas is adapted to strike thereagainst, and embodying a smoothly curved or rounded surface between the base and its side face whereby the gas after entering the casing and striking against the base is caused to flow in a thin stream around the side face of the valve and to pass directly into the outlet with substantially no pressure loss and in such manner as to create adjacent to the inner end of the casing outlet a jet action which increases in magnitude as the rate of flow of the gas into the outlet increases and effects a corresponding diminution or decrease in the pressure of the gas in the casing, and a lever for moving the valve in response to fluctuation of the diaphragm to and from the valve seat in order to regulate the pressure of the gas flowing out of the casing via the outlet, fulcrumed centrally in the casing and having the valve connected to one end thereof and its other end connected to the diaphragm so that it operates to open the valve when the diaphragm fluctuates in one direction as the result of a decrease in pressure within the casing.

6. In a pressure regulator of the character described, the combination with a casing having in another of its portions an inlet for gas under pressure and a gas outlet opposite the inlet, of means forming a valve seat around the inner end of the inlet, a valve for controlling the flow of gas into the casing disposed between the inlet and the outlet and in spaced relation with respect to the interior faces of said other portion of the casing and having a substantially flat face disposed directly opposite to the valve seat and adapted to have the gas strike thereagainst and also having an annular substantially continuous side face substantially centrally positioned with respect to the gas outlet and a smoothly curved or rounded surface between the two faces whereby when the valve is open the gas after striking against the flat face is caused to flow in a thin tubular stream round the side face and then to pass directly into the outlet with substantially no pressure loss, said valve also having a diametric slot in the portion thereof that is remote from the flat face, and a lever for moving the valve in response to fluctuation of the diaphragm to and from the valve seat in order to regulate the pressure of the gas flowing out of the casing via the outlet, fulcrumed centrally in the casing and having one end thereof connected operatively to the diaphragm and its other end extending into the slot in the valve and connected to the valve by a movable joint and of such thinness as to offer a minimum resistance to the thin tubular stream of gas around the side face of the valve.

7. In a pressure regulator of the character described, the combination with a casing having a diaphragm in one portion thereof and having in another of its portions an inlet for gas under pressure and a gas outlet opposite to the inlet, a valve for controlling the flow of gas into the casing disposed between the inlet and outlet and having a slot in the portion thereof nearest the outlet and a member extending across the outer portion of said slot, a lever for actuating the valve in response to fluctuation of the diaphragm fulcrumed centrally in the casing and having one end thereof connected operatively to the diaphragm and its other end extending into the slot in the valve, a stud and notch connection between the inner portion of the slot and the opposed face of said other end of the lever operative to permit the valve to move relatively to the lever, and spring means carried by said other end of the lever and applied to the cross member in such manner that the valve is urged toward said other end of the lever and the stud and notch of the aforesaid connection are thus yieldingly held in abutting relation.

GARNET W. McKEE.